Jan. 17, 1950 S. MENDELSOHN 2,494,956
REMOVABLE BATTERY CASE
Filed Sept. 20, 1945
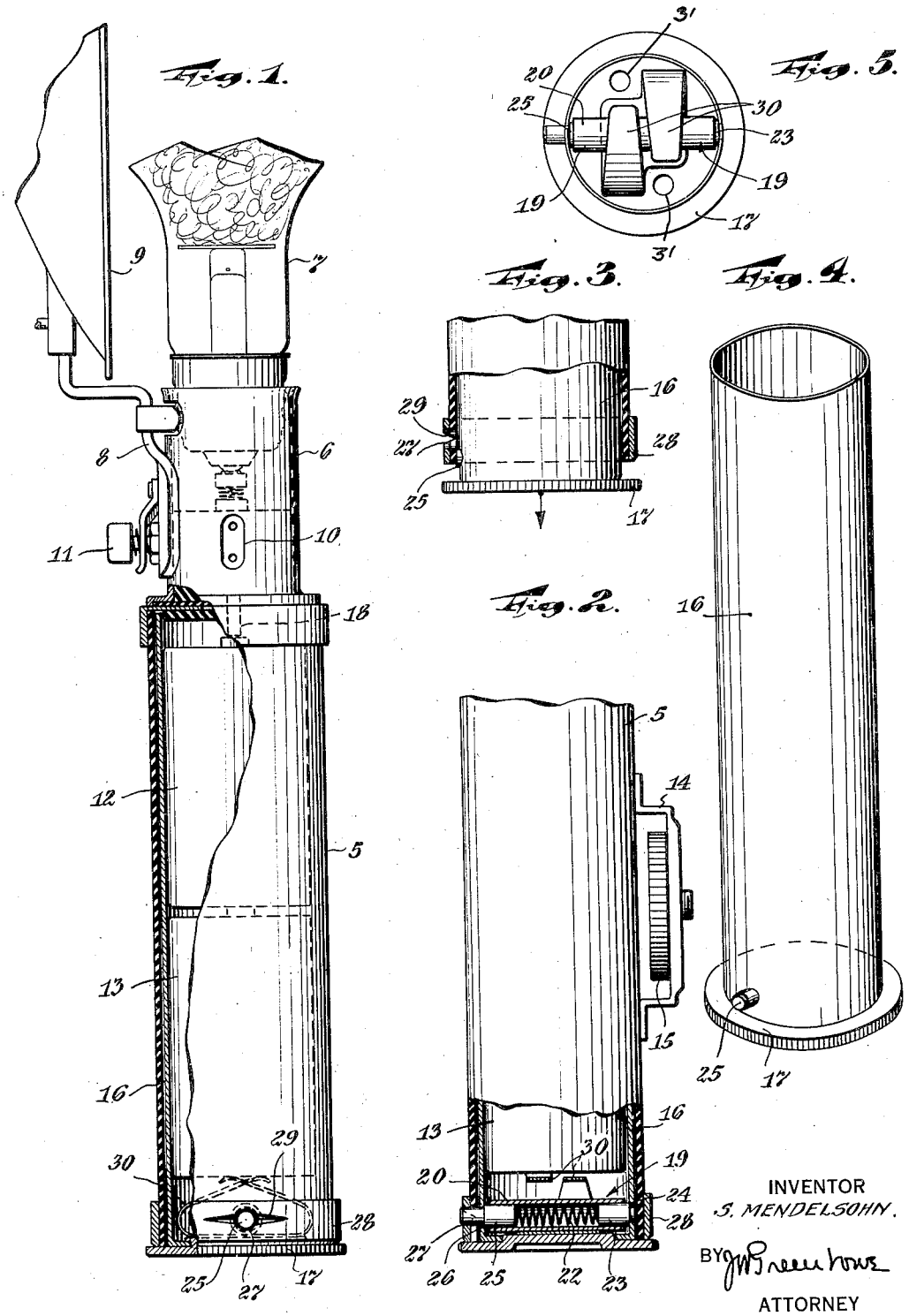
INVENTOR
S. MENDELSOHN.
BY
ATTORNEY Patented Jan. 17, 1950

2,494,956

UNITED STATES PATENT OFFICE 2,494,956

REMOVABLE BATTERY CASE

Samuel Mendelsohn, Montclair, N. J.

Application September 20, 1945, Serial No. 617,508

4 Claims. (Cl. 136—110)

1

The present invention relates to battery cases and particularly to a renewal battery case for camera synchronizers and flashlights.

It has long been known that dry cell batteries of the type used in flashlights and camera synchronizers are subject to corrosion due to their acid content which action is hastened under certain climatic conditions. As a result of this corrosion the battery adheres to the casing and it is often difficult if not impossible to remove the battery from the casing without in many instances destroying the battery case itself. This condition may not be too objectionable from the expense standpoint in connection with cheap flashlights since a new case may be purchased for a nominal price. It does, however, become a matter of considerable expense in connection with the higher priced flashlights and especially when occurring in battery cases for camera synchronizers including machined parts necessary for attaching the battery case to the camera or synchronizer which naturally increases its manufacturing cost.

It is an object of the present invention to provide an inner battery carrying case, or sleeve for a battery case, which telescopically engages the battery case proper and which may be disposed of with the dead batteries in the event the latter have corroded and stick in the case.

Another object of the present invention is the provision of a battery case provided with a disposable part which can be discarded with the dead batteries in the event of corrosion of the latter.

Another object of the present invention is the provision of a battery case for camera synchronizers wherein the case is provided with attachments for securing the case to a camera or synchronizer and having an inner case or sleeve for the batteries which may be disposed of with the latter at relatively low renewal expense in the event of corrosion and sticking of the batteries therein.

Still further objects of the present invention will become obvious to those skilled in the art by reference to the accompanying drawing, wherein, Fig. 1 is an elevational view partly in section and with parts thereof broken away of a battery case for a camera shutter constructed in accordance with the present invention;

2

Fig. 2 is a fragmentary view partly in section of the battery case as shown in Fig. 1 but taken at an angle of ninety degrees with respect to the latter;

Fig. 3 is a fragmentary view similar to Fig. 2 but showing the parts of the battery case of the present invention in partially disengaged position;

Fig. 4 is a perspective view of the disposible inner case or sleeve forming part of the battery case of the present invention, and Fig. 5 is a top plan view of the inner case or sleeve shown in Fig. 4.

Referring now to the drawing in detail a battery case 5 of the present invention is shown as a part of a camera synchronizer and provided with a socket 6 for supporting a photoflash lamp 7 and to which is connected a bracket 8 adjustably supporting a reflector 9 and which may be termed a photoflash or flashlight assembly. An attachment receptacle 10 is provided in the side of the socket 6 to receive a plug which connects with the camera shutter relay (not shown) for operating the camera shutter in the customary manner, and a push-button 11 to ignite the lamp and energize the relay by completing a circuit to the dry cell batteries 12 and 13. As will be seen from Fig. 2 the battery case 5 is provided on its side with a bracket 14 which supports a knurl headed screw 15 for fastening the device to the side of a camera (not shown).

In accordance with the present invention the batteries 12 and 13 are disposed within a disposable container case or sleeve 16 shown more clearly in Fig. 4. This sleeve 16 which may be of relatively low cost sheet metal is telescopically disposed in the battery case proper 5 by being inserted into the open bottom of the latter until a slightly larger diameter metallic closure member 17 provided on the sleeve 16 contacts the peripheral edge of the battery case 5 and thus serves as a metallic closure for the bottom of the case whether the latter be metal, plastic or the like.

In order to retain the inner sleeve or case 16 in telescopic engagement with the battery case 5 and at the same time place the batteries 12 and 13 in tensional engagement with the metallic sleeve 16 and the socket terminal 18, the sleeve 16 is provided with a latch-element indicated as a whole by the numeral 19.

By reference more particularly to Fig. 2 this latch 19 comprises a sleeve 20 having a length slightly less than the diameter of the inner case or sleeve 16 so that it may be disposed therein during assembly. A coil spring 22 within the sleeve 20 forces a plunger 23 at one end of sleeve 20 into an opening in the wall of the inner case 16 until its shoulder 24 engages the interior wall of the latter thus preventing the end of plunger 23 from protruding beyond the outer wall of the inner sleeve 16 and to prevent interference with its telescopic insertion into the battery case 5. The other end of the sleeve 20 is provided with a plunger 25 differing from the plunger 23 only in that it is of somewhat greater length from its shoulder portion 26 to its end so as to extend not only through the wall of the inner sleeve 16, as shown in Fig. 4, but also through an opening 27 provided in the wall of battery case 5 and its reinforcing collar 28, as shown in Figs. 1, 2 and 5.

Accordingly, when the inner case or sleeve 16 containing the batteries 12 and 13 is inserted into the battery case 5, the plunger 25 is depressed by the finger causing the plunger to pass into the battery case where it is rotated to align the plunger 25 with the opening 27 when it then snaps into the latter. To remove the inner sleeve 16 it is only necessary to depress the plunger 25 with the thumb-nail or the edge of a coin, since the reinforcing collar 28 is provided with a recess 29 intersecting the opening 27 as shown in Fig. 1. In order to apply tension to the batteries 12 and 13 as well as form an electrical contact therewith the bottom of the inner case or sleeve 16 is provided with a two-tongued spring contact 30 formed from a single sheet of material which passes under the latch 19 and is held in place thereby as shown more clearly in Figs. 2 and 5.

If after use the batteries have deteriorated or corroded to the casing as heretofore provided it often happened that the casing became distorted and damaged in attempts to remove the batteries. In the present case the inner casing may readily be removed and discarded with the useless batteries. On the other hand if the batteries are removable from the inner casing the latter may of course be again used. In order to facilitate the removal of the batteries from the inner or disposable casing several holes 31 are provided whereby a tool may be inserted to aid in the removal of the batteries.

It may not in all cases be necessary to discard the latch element 19 since in the event that this element has not been contaminated by the corroding batteries, it may be inserted in another shell or casing provided for a new set of batteries.

In accordance with the present invention a battery case is herein provided which is particularly adaptable to camera synchronizers and to flashlights wherein the battery case is provided with an inner case or sleeve for encasing the batteries and which inner case may be discarded with the dead batteries should corrosion result. Moreover, since the cost of the disposable inner case or sleeve is relatively small there is little loss to the owner and eliminates the relatively high cost of purchasing an entire battery case in the event of corrosion of the batteries which frequently occurs.

Although one embodiment of the present invention has been shown and described it is to be understood that still further modifications thereof may be made without departing from the spirit and scope of the appended claims.

What is claimed is:

1. A battery holder for a camera synchronizer and flashlight comprising a casing, an inner disposable sleeve for holding batteries and telescopically engaging the interior wall of said casing and provided with a flanged closure at one end which also forms an end closure for said casing, a two-tongued spring secured to the flanged closure of said disposable sleeve for applying tension to the batteries and for making electrical connection therewith, and a pair of diametrically opposed spring-pressed plungers carried by said disposable sleeve and engageable with openings provided in said casing for retaining said sleeve in said casing against the tension of said plunger spring.

2. A battery holder for a camera synchronizer and flashlight comprising a casing, an inner disposable sleeve for holding batteries and telescopically engaging the interior wall of said casing and provided with a flanged closure at one end which also forms an end closure for said casing when the disposable sleeve is inserted in said casing, a spring secured to the interior surface of the flanged closure of said disposable sleeve for applying tension to the batteries and for making electrical connection therewith, and a pair of diametrically opposed spring-pressed plungers carried by said disposable sleeve and engageable with openings provided in said casing for retaining said sleeve in said casing against the tension of said plunger spring and for retaining said first mentioned spring in its position on the interior surface of the flanged closure of said disposable sleeve.

3. A battery holder for a camera synchronizer and flashlight comprising a casing provided with a reinforcing collar adjacent one end thereof, an inner disposable sleeve for holding batteries and telescopically engaging the interior wall of said casing and provided with a flanged closure at one end which also forms an end closure for said casing, a distorted substantially U-shaped spring secured to the interior surface of the flanged closure of said disposable sleeve for applying tension to the batteries and for making electrical connection therewith, and a pair of diametrically opposed spring-pressed plungers carried by said disposable sleeve adjacent the reinforcing collar of said casing and engageable with aligned openings provided in said casing and its reinforcing collar for retaining said sleeve in said casing against the tension of said spring.

4. A battery holder for a camera synchronizer and flashlight comprising a casing provided with a reinforcing collar adjacent one end thereof, an inner disposable sleeve for holding batteries and telescopically engaging the interior wall of said casing and provided with a flanged closure at one end which also forms an end closure for said casing when the disposable sleeve is inserted in said casing, a spring secured to the interior surface of the flanged closure of said disposable sleeve for applying tension to the batteries and for making electrical connection therewith, a pair of diametrically opposed spring-pressed plungers carried by said disposable sleeve adjacent the reinforcing collar of said casing and engageable with aligned openings provided in said casing and its reinforcing collar for retaining said sleeve in said casing against the tension of said plunger spring and for retaining said first mentioned spring in its position on the interior surface of the flanged closure for said disposable sleeve, and finger-nail recesses provided in said reinforcing collar and coinciding with the openings therein to facilitate depression of said plungers for removal of said disposable sleeve from said casing.

SAMUEL MENDELSOHN.

REFERENCES CITED

The following references are of record in the file of this patent:

UNITED STATES PATENTS

| Number | Name | Date |
|---|---|---|
| Re. 15,022 | Burgess | Jan. 11, 1921 |
| 595,327 | Meyer | Dec. 14, 1897 |
| 884,481 | Glaus | Apr. 14, 1908 |
| 1,406,359 | Ford | Feb. 14, 1922 |
| 1,544,772 | Osean | July 7, 1925 |
| 2,221,126 | Barbee | Nov. 12, 1940 |
| 2,312,305 | Berlinger | Mar. 2, 1943 |

FOREIGN PATENTS

| Number | Country | Date |
|---|---|---|
| 420,997 | Great Britain | Dec. 12, 1934 |
| 770,888 | France | July 9, 1934 |